United States Patent [19]
Pytlewski

[11] 3,890,429
[45] June 17, 1975

[54] INORGANIC STANNIC OXIDE POLYMERS AND METHOD FOR THE PREPARATION THEREOF

[75] Inventor: Louis L. Pytlewski, Philadelphia, Pa.

[73] Assignee: Research Corporation, New York, N.Y.

[22] Filed: Oct. 22, 1971

[21] Appl. No.: 191,865

Related U.S. Application Data

[63] Continuation-in-part of Ser. No. 71,426, Sept. 11, 1970, Pat. No. 3,676,186, which is a continuation-in-part of Ser. No. 591,717, Nov. 5, 1966, abandoned.

[52] U.S. Cl. .................... 423/395; 117/54; 117/69; 117/72; 117/93.4 NC; 117/124 B; 117/138.8 UF; 252/313 R; 423/462; 423/544; 423/618
[51] Int. Cl. . C01b 21/48; C01g 19/02; C01g 19/04
[58] Field of Search .......... 423/618, 395, 462, 544; 117/93.4 NC, 124 B, 138.8 UF, 69, 72, 54

[56] References Cited
UNITED STATES PATENTS

| | | | |
|---|---|---|---|
| 2,194,189 | 3/1940 | Wheeler et al. | 117/54 UX |
| 3,011,920 | 12/1961 | Shipley, Jr. | 117/213 |
| 3,013,901 | 12/1961 | Bugosh | 117/72 |
| 3,657,003 | 4/1972 | Kenney | 117/120 |

FOREIGN PATENTS OR APPLICATIONS

| | | | |
|---|---|---|---|
| 729,581 | 3/1966 | Canada | 117/69 |

OTHER PUBLICATIONS

Mellor, J. W., "A Comprehensive Treatise on Inorganic and Theoretical Chemistry," Longmans, Green & Co., New York, (1927), Vol. VII, pages 424 & 425, QD31.M4.
Mellor, J. W., "A Comprehensive Treatise on Inorganic and Theoretical Chemistry," Longmans, Green & Co., New York, (1947), Vol. XV, page 660, QD31.M4.
Vold et al.: "Colloid Chemistry," Reinhold Publishing Corp., New York, (1964), page 1.
Shaw: "Introduction to Colloid and Surface Chemistry," Butterworths, London, (1966), pages 1, 8–10, 123–125.
Hackh's Chemical Dictionary, 4th Edition, (1969), page 361.

*Primary Examiner*—Richard D. Lovering
*Attorney, Agent, or Firm*—Oblon, Fisher, Spivak, McClelland & Maier

[57] ABSTRACT

Inorganic stannic oxide polymers are provided which are comprised of a major portion of repeating units of the formula

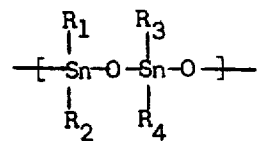

in which at least one of the groups $R_1$–$R_4$ is —OH or —O— and at least one of the groups $R_1$–$R_4$ is an anion of a water soluble salt of tin (IV) such as a chloride, bromide, nitrate, sulfate anion etc., with the remainder of the groups being —OH, —O— or an anion as defined above and a minor portion of repeating units of the formula

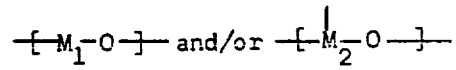

wherein $M_1$ is a divalent metal ion and $M_2$ is a trivalent metal ion. $M_1$ and $M_2$ are metallic ions of the same or different metal. The suitable metal ions exhibit two stable states of oxidation in an aqueous system. The polymers of this invention are positively charged and are highly hydrophilic. The polymers of this invention are especially useful for changing surface characteristics of a substrate such as imparting hydrophilic properties to normally hydrophobic materials.

10 Claims, 1 Drawing Figure

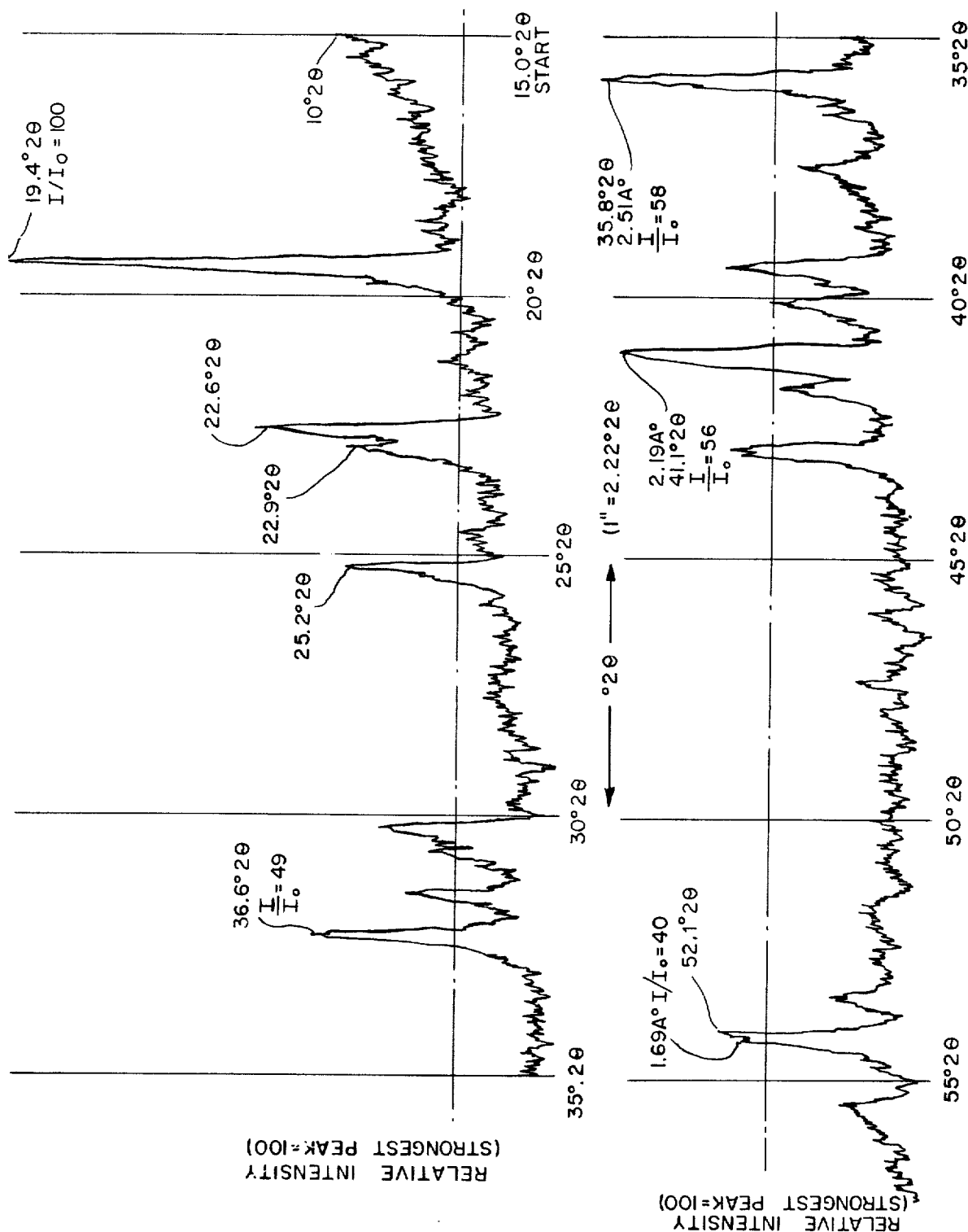

INORGANIC STANNIC OXIDE POLYMERS AND METHOD FOR THE PREPARATION THEREOF

CROSS REFERENCE TO RELATED APPLICATIONS

This application is a continuation in part of copending application Ser. No. 71,426, filed Sept. 11, 1970, now U.S. Pat. No. 3,676,186 which in turn is a continuation in part of application Ser. No. 591,717, filed Nov. 5, 1966, now abandoned.

BACKGROUND OF THE INVENTION

1. Field of the Invention

This invention is concerned with a novel class of inorganic polymers. More particularly, this invention relates to hydrophilic, positively charged stannic oxide polymers.

2. Description of the Prior Art

The polymer art is a highly developed art and is still under active investigation by those skilled in the art. Almost all of the prior art has been concerned with organic polymers, that is, polymers based on carbon containing monomers. The organic polymers are relatively easy to form because of the ability of the carbon atom to bond to itself. Various types of polymers have also been made using silicon containing monomers because silicon in many respects has chemical properties which are similar to carbon. For this reason the silicon polymers can be considered to be quasi-organic polymers.

Relatively little effort has been made to produce and evaluate inorganic polymers. It has been reported that certain inorganic compounds normally exist as lower polymers such as dimers and trimers. Some inorganic polymers have been produced such as the polymers based on the boron atom which are comprised of $B_4O_7$ repeating units, and various types of polyphosphates have likewise been produced. However, to date, no substantial amount of work has been reported wherein polymers have been prepared from inorganic monomers such as metallic salts, metallic oxides, and the like. Accordingly, little is known of the properties of this class of polymers aside from that disclosed in applicants' previously filled application noted above.

It is accordingly an object of this invention to provide useful inorganic polymers.

It is a further object of this invention to provide a simple process for the preparation of inorganic polymers.

Other objects and advantages of this invention will become further apparent hereinafter from a continued reading of the specification and sub-joined claims.

SUMMARY OF THE INVENTION

A novel class of inorganic polymers is provided in which stannic oxide monomeric units are the principal repeating units and which further contains minor amounts of metallic oxide monomeric units of metals having a valence of +2 or +3.

BRIEF DESCRIPTION OF THE DRAWING

The FIGURE is a graphic representation of the X-ray diffraction pattern of the preferred stannic oxide-stannous oxide polymer of this invention.

DESCRIPTION OF THE PREFERRED EMBODIMENTS

In the description of the preferred embodiments of this invention, the term "polymer" is used in its conventional meaning referring to a molecule which is comprised of a plurality of repeating units of the same or similar chemical structure which are chemically bonded to each other. The polymers of this invention should be carefully distinguished from the crystalline form of certain inorganic materials including the starting materials used to prepare the polymers of this invention. In the crystalline form the individual ions, atoms and molecules are arranged in a given geometrical configuration and are held in this configuration by electrical and/or covalent bonds. A crystal, when it is dissolved in a suitable solvent, dissociates into the individual ions, atom and/or molecules which initially comprised the crystal.

The polymers of this invention, on the other hand, have a high molecular weight and even when dissolved or dispersed in a solvent are present in the form of macro-molecules. Each of the molecules is comprised of a plurality of repeating monomeric units.

The polymers of this invention are preferably prepared in the form of a hydrosol that is a colloidial dispersion of the polymer in water. In order to obtain certain properties in the resulting hydrosol, namely a positive charge and excellent hydrophilic properties, a combination of metallic salts is used in which the valence of the metallic ions in the monomeric units comprising the major portion of the polymers is higher than the valence of the metallic ion in the second type of monomeric units. It is believed it is the equilibrium exchange of electrons between the two stable valence states of the metal ions in the monomeric units inhibits precipation and which thus gives the polymers their high molecular weight, highly positive character and hydrophilic properties.

The polymers of this invention are comprised of a major amount of stannic oxide units of the formula

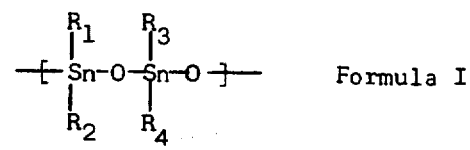

Formula I wherein at least one of the groups $R_1-R_4$ is —OH or —O— and at least one of the groups from $R_1-R_4$ is an anion of a water soluble salt of tin such as chloride, bromide, nitrate, sulfate and the like. The remainder of the groups $R_1-R_4$ are OH, —O— or an anion as defined above. The stannic oxide momomeric units of Formula I in a given polymer can be the same or different. When none of the groups $R_1-R_4$ are an —O—group, the polymers which are produced are linear in nature. However, when one or more of the groups $R_1-R_4$ is an —O— group, the polymer chains can cross-link with each other to produce a three dimensional polymeric structure. The polymers of this invention also contain a second type of monomeric units as pointed out above. These monomeric units are selected from the group consisting of metal oxide monomers of the formula

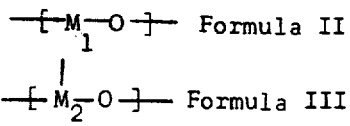

and mixtures thereof, wherein $M_1$ is a metallic ion of a metal having a valence of +2 and $M_2$ is a metallic ion of a metal having a valence of +3. The metal oxide monomeric units that are employed as the second monomeric unit can be selected from the oxide of various metals which have two stable states of oxidation in an aqueous system. The metal includes, for example, iron, cobalt, nickel, bismuth, lead, titanium, vanadium, chromium, copper, molybdenum, antimony, tungsten, and most preferably tin.

The amount of the monomeric units of Formula II or III which is employed is small in comparison to the amount of the stannic oxide monomeric units of Formula I. The amount of the metallic oxide monomer of Formula II or III which is used is an amount which is sufficient to maintain the polymer in a colloidal dispersion in water, that is in the form of a hydrosol, and to maintain a strong positive charge on the resulting polymer. This amount is generally limited by the solubility of the salts of the metal used to provide the monomeric units of Formula II or III. The relative amount of the monomeric units of Formula II or III is generally about 5% by weight of the total polymer. The weight percentage is not, however, the critical determining factor, but rather the amount of the monomeric units of Formula II or Formula III required to maintain the polymer in a colloidal dispersion.

The exact structure of the resulting polymer is not precisely known. It is believed, however, that when a monomeric unit of Formula II is used that the polymer is comprised of monomeric units connected in the following manner:

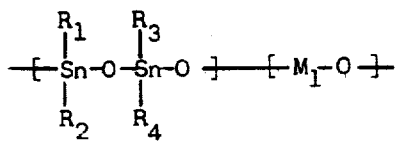

When one or more of the groups $R_1$–$R_4$ is —O—, sidechains can form and cross-linking can also occur especially when the monomeric units of the formula

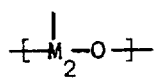

are included in the polymer chain. Such a polymer could have, for example, the following formula:

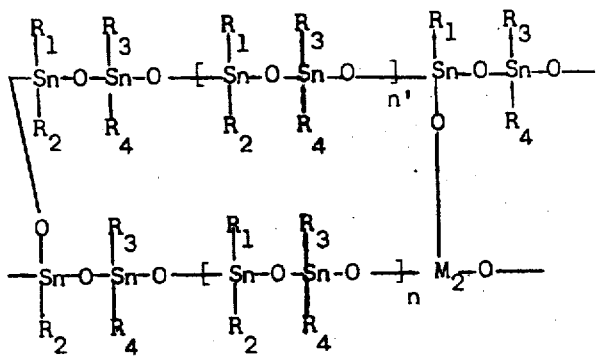

The letters n and n' in the above formula represents a relatively large number, for example, 50–10,000.

As can be seen from the above formulae, there is a large variety of different polymeric structures which can be produced in accordance with the present invention. It should be appreciated that although the above formulae are believed to be accurate, other types of polymeric structures are likewise possible. Applicant does not intend to limit the invention to polymers of the above structures but to polymers as produced in accordance with the disclosure of this invention.

A highly advantageous polymer of this invention is the polymer comprised of stannic oxide and stannous oxide monomeric units. This polymer is comprised of monomeric units of the formula

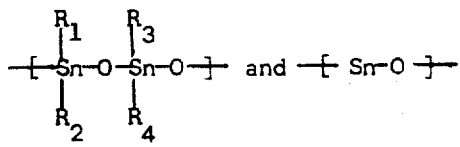

It forms into a very definite polymeric composition when a sufficient excess of the source of the stannous oxide monomeric unit is present in the reaction mixture to insure that the resulting polymer is saturated with stannous oxide monomeric units. The polymer is produced in an aqueous reaction medium. The resulting polymer is colloidal in character. Even if the water of the hydrosol is completely removed, the resulting polymer can be redispersed by the addition of water and the product will still be a stable colloidial dispersion of the polymer.

The X-ray diffraction pattern of this stannic oxide-stannous oxide polymer is shown in FIG. 1. The characteristic peaks of the X-ray diffraction pattern are as follows:

| "d" Spacing (A°) | Relative Intensity I/Io |
|---|---|
| 4.57 | 100 |
| 3.93 | 50 |
| 3.88 | 31 |
| 3.53 | 33 |
| 2.95 | 33 |
| 2.91 | 22 |
| 2.84 | 29 |
| 2.77 | 49 |
| 2.51 | 58 |
| 2.40 | 16 |
| 2.28 | 32 |
| 2.25 | 22 |
| 2.19 | 56 |
| 2.16 | 20 |
| 2.11 | 33 |
| 1.92 | 8 |
| 1.71 | 16 |
| 1.69 | 40 |
| 1.65 | 13 |
| 1.58 | 15 |
| 1.53 | 22 |
| 1.42 | 22 |

This X-ray diffraction pattern is highly characteristic for the preferred stannic oxide-stannous oxide polymer of this invention.

The starting materials which are used to prepare the polymers of this invention are readily available, well-known metallic salts. The salts which are used to produce the monomeric units of Formula I are water soluble stannic salts. These salts include, for example, the halogen salts such as chloride and bromide, nitrate salt, sulfate salt and other similar water soluble stannic salts. The salt which is preferably used to produce the stannic oxide monomers of Formula I is stannic chloride pentahydrate since this salt will readily dissolve in water and hydrolize to the desired monomeric units of Formula I.

The metallic salts used to produce the monomeric units of Formula II or Formula III must be soluble in water. The salts which are used to produce the monomeric units of Formula II or III include water soluble salts of metals, the ions of which exhibit two stable states of oxidation in water such as iron, cobalt, nickel, lead, bismuth, titanium, vanadium, chromium, copper, molybdenum, antimony, tungsten and most preferably tin. The anion of the salt as noted is selected so that the salt is soluble and can be hydrolized to the monomeric units of Formula II or III. The anion includes the halides such as chloride and bromide, nitrate, sulfate and the like. Salts of simple organic acids can likewise be used, such as the metallic salts of the oxalates, acetates and the like.

To obtain the monomeric units of Formula II or Formula III it is also possible to add the metal directly to the aqueous reaction medium in a finely divided form. In this case it should be appreciated that the metal is oxidized from a higher valence state, a corresponding amount of the stannic ions (+4) are reduced to stannous ions (+2). If the metal selected is one which has two stable states of oxidation in an aqueous system, the oxides of the metal, as well as the stannous oxide produced as a result of the oxidation-reduction reaction, becomes part of the resulting polymer. If, however, the metal does not have two stable states of oxidation it reduces a portion of the stannic ion but does not become part of the final polymer and can if desired be isolated from the hydrosol.

In order to further show the electron exchange which occurs as a result of the process of the invention, the various reactions which occur are shown. The reactions are classified according to the type of metal or metal salt employed to form the monomeric units of Formula II and III. In each of the equations, it is assumed that a large excess of the Sn+4 ion is present. The ions which become part of the final polymer are underlined.

1. Use of metals having two stable states of oxidation in an aqueous medium

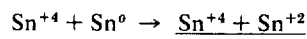

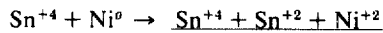

2. Use of metal salts having two stable states of oxidation in water.

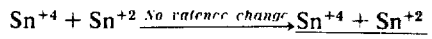

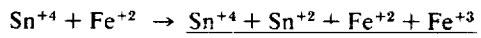

3. Use of metal not having two stable states of oxidation in solution

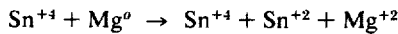

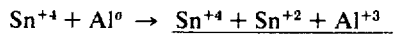

While the hydrosols of the invention are characterized by their exceptional stability, it is of advantage to allow a small amount of a metal, such as metallic tin to remain in the container in which the hydrosol is stored so as to further insure the stability of the hydrosol. This is especially advantageous when the hydrosol is to be exposed to air since the excess metal reduces additional amounts of stannic ion to the stannous form in the event that a portion of the stannous ions are oxidized as a result of exposure to atmospheric oxygen.

The polymers of this invention are prepared in the form of a hydrosol by dissolving the tin +4 salts in water. The +2 or +3 metallic salt or finely divided metal is added to the aqueous mixture. The aqueous mixture is then carefully heated up to a point somewhat below the boiling point of the reaction mixture. As the temperature increases, there will be a change in the color of the reaction mixture. This change in color is believed to be due to a rapid electron exchange between the higher valent and the lower valent ions. The color of the solution is an indication of the degree of polymerization of the polymer with a deeper color being indicative of a higher molecular weight. The desired molecular weight of the resulting polymer is dependent upon the intended end use of the polymer as will be explained in greater detail below. After the desired degree of polymerization has been achieved, as determined, for example, by an evaluation of the color of the reaction mixture, the reaction mixture is allowed to cool to room temperature.

The polymer can be isolated using conventional methods. However, it is generally not necessary for most purposes to have the polymer in the absolute pure form. As noted above, the polymers of this invention have a strong positive charge. The residues from the reaction are, relative to the polymer, either insoluble, electrically neutral or non-colloidal. When the polymer of this invention is applied to a negatively charged substrate, the polymer adheres to the negatively charged substrate due to the difference in the charges of the substrate and the polymers and possibly chemical bonding. When the substrate is washed with water the residues and excess amounts of polymer will be removed.

The polymer can be recovered from the reaction medium and will not further polymerize providing heat is not used to remove the water used as the reaction medium. The dried polymeric material is stable. The polymer can readily be converted back into the hydrosol form by reconstituting it with water. Because of the high positive charge, colloidal partial size and the hydrophilic nature of the polymer, it readily disperses into water.

The polymers of this invention have a wide variety of utilities. The polymers, because of their high positive charge, have a natural affinity for negatively charged materials. As is pointed out in application Ser. No. 591,717 filed Nov. 5, 1966, now abandoned, and U.S. Pat. No. 3,676,186, the polymers of this invention are especially useful in the treatment of negatively charged substrates such as glass, plastics, and the like for altering the surface characteristics of the substrate.

It is believed that the polymer is formed on the negatively charged surfaces in a relatively continuous film which is only one particle in thickness. The film does not change the color of the surface as observed by the naked eye. It has been found that a typical film of this invention is about 1,000A thick.

As noted above, the size of the polymer molecules produced in accordance with this invention is dependent to a large extent on the desired end use of the polymer. For example, part of the reason for soiling of materials is surface roughness which physically entraps soils. Accordingly, if the base material is relatively rough, a polymer having large particle size can advantageously be used since this assists in filling in holes and results in a smoother surface. However, if the surface of the material to be treated is relatively smooth, a polymer having a smaller particle size is preferably utilized.

The hydrophilic properties of the polymer of this invention are highly important in certail utilities. As pointed out above, when used on glass surfaces the hydrophilic properties of the polymer increase the wetting properties of the glass and allows rain water and the like to effectively cleanse soiled glass surfaces.

An additional advantageous use of the polymer of this invention is in the paper making art. The polymer of this invention, which is preferably produced in a somewhat larger particle size than that used for soil retardance on glass, is incorporated in the paper, generally in the pulp, as it is processed; or if desired can be added as an after-treatment to the paper. The polymer of this invention substantially increases the hydrophilic properties without adversely effecting the other desirable properties of the paper. As is well known, paper pulp at the beginning of the the beating cycle has a high absorbancy but a relatively low strength. As the pulp is beaten the strength increases but the absorbency simultaneously decreases. For many purposes it is extremely difficult to obtain a satisfactory balance of properties between strength and absorbency. Attempts have been made to limit the amount of beating and obtain the required strength with the use of a wet strength resin and the like. The strength is increased using wet strength resins; however, the absorbency is generally decreased somewhat and the material and process costs are quite substantial. Processes have also been suggested wherein conventional wetting agents are added to the paper stock. These processes were likewise found to be unsatisfactory because of the cost required in order to obtain a satisfactory product. It has been found, however, that the polymers of this invention, which are very low in cost because of the low cost of the starting materials and the simplicity of the manufacturing process, can be used advantageously to increase the water absorption without decreasing the strength or other desirable properties of the paper.

In the textile art, certain fibers because of their hydrophobic character will accumulate an undesirable static electric charge in a dry atmosphere. The polymers of this invention are substantive to these fibers because these fibers generally are negatively charged while the polymers of this invention are positively charged. The polymers of this invention, because they are hydrophilic in character, tend to draw sufficient moisture from the atmosphere to prevent the build up of static electric charges on the fibers. It should also be noted that at the same time the polymers of this invention act as a soil retardant, preventing the accumulation of soil on the fibers. Furthermore, if the fibers do become soiled, the polymers of this invention assist in the wetting out process of the fibers during washing and thereby materially assist in removing the soil from the fibers.

It is highly important that the polymer film of this invention be firmly adhered to the base material. It is for this reason that the base material should be thoroughly cleaned before the application of the polymers of this invention. This can be done by conventional means such as using a strong detergent and water and then rinsing the washed surface with additional water until free of any residue. The surface is then coated with a solution of the polymers of this invention at room temperature. Any excess polymer is removed by simply rinsing the coated surface with additional amounts of water.

In environments where the treated material will be subjected to negatively charged soil, in addition to the more common positively charged soils, it is of considerable advantage to apply a coating over the polymer film of this invention of a negatively charged particle. One type of negatively charged particle which has been found to be of considerable advantage is colloidal silica. The negatively charged coatings are applied in sufficiently thin layers so that the hydrophilic properties of the polymer of this invention are not substantially effected. However, the net positive charge of the combination generally will be reduced or neutralized which materially assists in preventing the accumulation of negatively charged soils on the treated material.

The following examples are given by way of further illustration of the present invention and are not intended to limit in any way the scope of the present invention beyond that of the subjoined claims. All parts and percentages are given in parts and percentages by weight, unless otherwise indicated.

EXAMPLE 1

Fifty grams of $SnCl_4 \cdot 5H_2O$ were dissolved in 1,000 grams of water. Five grams of metallic tin were added to this mixture. The mixture was gradually heated with stirring to 80°-90°C. The mixture was carefully monitored so as to prevent the mixture from boiling. As the temperature increased there was a noticeable change in color. At 70°C the color was light yellow. At 80°C the color was deep amber. When the mixture reached 90°C, it was then allowed to cool to room temperature. The resulting hydrosol which was obtained was decanted from the residual excess metallic tin.

EXAMPLE 2

Example 1 was repeated except that 5 grams of stannous chloride were used in place of the 5 grams of metallic tin. The resulting hydrosol was found to be identical to the hydrosol produced in Example 1 in both appearance and physical characteristics.

EXAMPLE 3

Example 1 was repeated except that finely divided aluminum metal was used in place of the metallic tin.

EXAMPLE 4

Example 1 was repeated except that nickel metal was used in place of the metallic tin.

EXAMPLE 5

Example 1 was repeated except that chromous chloride was used in place of metallic tin.

EXAMPLE 6

Example 1 was repeated except that chromous acetate was used in place of metallic tin.

EXAMPLE 7

Example 1 was repeated except that chromium metal was used in place of the metallic tin.

EXAMPLE 8

Example 1 was repeated except that ferrous acetate was used in place of the metallic tin.

EXAMPLE 9

Example 1 was repeated except that ferrous chloride was used in place of the metallic tin.

EXAMPLE 10

Example 1 was repeated except that finely divided metallic iron was used in place of the metallic tin.

EXAMPLE 11

Example 1 was repeated except that bismuth (III) nitrate was used in place of the metallic tin.

EXAMPLE 12

Example 1 was repeated except that metallic bismuth was used in place of the metallic tin.

EXAMPLE 13

The products produced in Examples 1 and 2 were vacuum dried. The products were found to be identical in appearance, being yellow-orange powders. A portion of each of the powders was mixed with water and found to be readily reconstituted back into the hydrosol state. A further portion of each material produced in each of Examples 1 and 2 was evaluated by X-ray diffraction techniques. A graph of the X-ray diffraction pattern is shown in the FIGURE.

EXAMPLE 14

A 5 percent solution of the polymer of Example 1 and a 5 percent solution of the polymer of Example 2 were prepared. These solutions were wiped on panes of glass and panes of polymethylmethacrylate, which had previously been thoroughly washed with detergent and water and then rinsed with additional amounts of water. The resulting films were measured by light interference techniques and the films were found to be approximately 1,000 A thick. There was no noticeable change in the color or transparency of the panes as a result of the application of the coatings. Each treated pane was divided into vertical halves of which one half was sealed in an envelope protected from atmospheric soiling. The other half of the pane was exposed to atmospheric conditions together with an untreated third pane of glass and an untreated third pane of clear polymethymethacrylate. The area selected for the testing was a center city location where the atmosphere contained a relatively high amount of soil due to the presence of factories, highways, and commercial buildings in the immediate area. Each of the samples was visually evaluated over a 24 -month period against the unexposed samples. The untreated samples rapidly became soiled and had to be cleaned periodically. Both the treated glass and the treated polymethylmethacrylate samples exposed to atmospheric soiling resisted soiling and after each rain cleansed themselves of soil. It was further found that the treated samples could, by simple washing with water, be cleansed so as to be as clean as the samples which had been protected from atmospheric soiling. After the 24-month period each of the samples was found to be still quite satisfactory with regard to the soil retardant characteristic.

EXAMPLE 15

Each of the polymers produced in Example 1 through 12 was applied in the form of a hydrosol to previously cleansed glass panes and the excess amount of the hydrosol was washed off with water. The samples were then dried. The samples were evaluated together with a blank in an accelerated soiling test. In the accelerated soiling test each of the samples was repeatedly subjected to soiling with a dry soil. The samples were then sprayed with water and thereafter allowed to dry. The test was repeated for a plurality of cycles. During the test, the samples were periodically evaluated. It was found that the soil in the dry condition tended to adhere to the untreated panes, while all of the treated materials resisted soiling. Furthermore, on being rinsed, the untreated samples tended to streak and spot while the treated samples readily wet out and cleansed themselves as described in said Continuation-In-Part application referred to at page 1, line 28 of this specification, this invention relates in its broader attributes to providing a thin coating on the surfaces to be treated which is obtained by applying to the surfaces a positively charged hydrosol of a metal which exhibits two stable states of oxidation simultaneously while in solution.

Particular reference will be made to the treatment of glass particularly in the form of window panes and the like, since this is one of the more difficult and commercially important surfaces that can be rendered soil retardant by the compositions of this invention. It should be appreciated, however, that this invention is not limited to the treatment of glass surfaces but can be used with various other materials such as textiles, plastics, paper, painted surfaces and the like.

The surfaces of many materials appear to be very smooth when examined visually. The typical glass pane when newly manufactured appears to be extremely smooth, however when it is examined microscopically, it can be seen to contain a considerable number of surface imperfections, such as grooves, pores, riles and the like. Glass which has been in use and exposed to the elements has an even greater degree of roughness and imperfections. These imperfections, while invisible to the naked eye, do have a major effect on the soiling property since the imperfections mechanically hold the soils on the surface of the glass.

Untreated glass surfaces, once soiled, are not readily cleaned by rain or other natural elements and must be washed with soap or detergents, rinsed and then wiped dry. The reasons that glass panes are not cleaned by the rain and other natural elements and in fact, are made to appear even more dirty by being contacted by droplets of rain water is that the glass is inherently hydrophobic. The rain does not wet out the surface of the glass and there is a tendency for the water, contacting the surfaces of the glass to bead up and form spots on the glass surfaces together with the dirt.

It has been found in accordance with the teachings of this invention that these two major causes of soiling can be corrected by applying to the surface to be treated a colloidal hydrosol of a metal salt in which the metal thereof exhibits two stable states of oxidation while in solution. The hydrosol solutions are almost always colored to some extent apparently due to the rapid exchange of electrons as shown by the following charge transfer mechanism.

$$M^n \rightleftarrows M^{n+x} + e^-$$

More specifically, the metallic elements are believed to follow the following electron exchanges.

$$Sn^{-2} \rightleftarrows Sn^{+4} + 2e^-$$
$$Fe^{+2} \rightleftarrows Fe^{+3} + 1e^-$$
$$Ni^{+2} \rightleftarrows Ni^{+4} + 2e^-$$
$$Bi^{+3} \rightleftarrows Bi^{+5} + 2e^-$$

A further requirement for the hydrosols is that the metallic ions of the hydrosol hydrolize rapidly in the initial step and then very slowly, if at all, because of the rapid electronic exchange. For example, in the oxidation of tin $$Sn^{+4} + OH_2 \rightleftarrows Sn(OH)^{+3} + H^+$$

would be very rapid while the second step of $$Sn(OH)^{+3} + HOH \rightleftarrows Sn(OH)_2 + 2 + H^+$$

would be very slow or non-existent. The partial hydrolysis of the metal ion or ions is the source of the colloidal particles and the incomplete hydrolysis is believed to be the source of the high positively charged, finely divided colloidal particles.

The metallic salts which may be used in this invention are the salts of for example, tin, iron, nickel and bismuth as noted above. In addition, salts of metals such as titanium, vanadium, chromium, cobalt, copper, arsenic, molybdenum, antimony, tungsten and lead may also be used in this invention. Some typical metal salts which may be used in the hydrosols employed in the coatings of this invention are:

$$SnCl_4 \cdot 5H_2O, FeCl_3 \cdot 6H_2O, Cr(C_2O_4)_3, CrCl_3, BiCl_5, CoCl_3$$

and $Fe(C_2H_3O_2)_3$

Other salts of the above noted metals may likewise be such as the nitrates and sulfates which are soluble in water and the ions formed must be weak oxidizing and reducing agents.

The colloidal hydrosols when applied to the surface, because of their highly positive nature, form a tight bond to the negatively charged glass surfaces. The coating formed by the hydrosol fills in the imperfections in the surface of the glass thereby reducing the mechanical adhesion of soils to the treated surfaces. What is of even greater significance however, is that the surfaces of the treated material, for example glass is converted from a hydrophobic surface to a hydrophilic surface. The surface of the glass will resist soiling and what soiling does occur is removed by the elements such as rain. The treated glass surfaces wet out readily and the rain water and the soils flow off the glass surfaces. Furthermore, because of the hydrophilic nature of the glass coated surfaces, they will dry spot free and clean.

The treatment of the glass surfaces is very simple and can be conducted as the glass is manufactured or it can be applied to the surfaces of the glass already installed by simply wiping the hydrosol solutions onto the glass as part of the window washing process. In existing installations, the window would be washed in the normal manner with a detergent and water to remove the adhered soils. The hydrosol solution would then be applied to the cleaned surface and any excess amount would then be washed off with plain water. After treatment, however, the window will not have to be washed on a regular basis. Even in periods of prolonged drought or if the window is not exposed to the elements, it can be cleaned by simply hosing the glass surface down with plain water. The treatment of this invention results in a coating of about 1,000 angstoms thickness which does not noticeably change the color or transparency of the treated surfaces. The treatment of the glass surfaces is a relatively permanent treatment despite the simplicity with which it can be applied. The effectiveness of the treatment is of course dependent upon the particular conditions encountered in a given application. It has been found, however, that even after exposure to the environment in a highly developed commercial metropolitan area that the treatment was still highly effective even after 18 months of continuous exposure. The exact length of time that the treatment will remain effective could not be estimated since there was no noticeable change in its soil resistance and wetting out characterisitcs. During this time, the natural elements of rain, snow, etc., washed the windows free of any accumulated dirt.

The highly effective nature of the hydrosols of this invention in improving the wetting out properties is even more surprising when it is evaluated as a treatment for certain types of plastics. One particular type of plastic, polytetrafluoroethylene is noted for its hydrophobic properties. However, when the surface of a polytetrafluoroethylene article is treated by wiping it with one of the hydrosols of this invention, the surface will thereafter readily be wet out with plain water. The treatment of this invention is of course equally applicable to other types of materials in addition to the glass and the specifically named plastic, polytetrafluoroethylene. For example, there has been a recent trend to the use of acrylate sheeting in place of glass for windows. This material is highly prone to soiling. However, when the acrylate sheeting is treated with a film of the hydrosol of this invention, it will resist soiling in approximately the same manner as glass treated in accordance with the process of this invention.

If the environment in which the material to be treated so as to be soil retardant in accordance with the process of this invention contains a relatively large amount of negatively charged soils or negatively charged oily contaminants in the air it is of considerable advantage to apply a layer of a negatively charged colloidal silica over the positively charged hydrophilic, hydrosol layer of the metallic salt in order to prevent the buildup over a period of time of a hydrophobic film over the hydrophilic film of this invention and thereby compromise the self cleaning properties of the hydrophilic film described above. It is also of some advantage to apply the colloidal silica in areas which are not subject to excessively heavy soiling with oily contaminants since this treatment will, to some extent, even further extend the useful life of the hydrophilic soil retardant layer. Because of the positive charge of the initial positively charged layer, the silica layer can be applied in a very thin layer which does not have the surface or substantially affect is hydrophilic properties.

The colloidal dispersions of silica used in the process of this invention are preferably in the form of a dispersion in water of silica particles which have previously been treated so that the resulting dispersion is colloidal and at the same time, characterized by the fact that the colloidally dispersed particles carry a negative charge.

The particles preferably have a size in the order of fifteen millimicrons or smaller. One such colloidal dispersion containing about 30 percent silica is sold by E. I. du Pont de Nemours Company under the trade name of "Ludox." The colloidal silica film is applied directly to the previously formed film of the hydrosol. An advantage to this invention is that if the silica layer is desired or required, it can be applied in the same manner as that employed through the application of the initial film of the hydrosol of the metal salt, that is, by simply wiping it on to the surface of the material to be treated. The previously applied film of the colloidal metal salt is strongly cationic and therefore forms a strong bond between the glass and the silica layer without the use of heat or other expedients which were heretofore required in order to obtain a permanent treatment.

It should be appreciated that the positively charged coating disclosed above while being especially useful as soil retardant is not limited to this use. There are many other applications wherein changing the surface charge from a positive charge to a negative charge is highly desirable. For example, paper can be treated in this manner so as to a positively charged paper surface which makes it especially useful in electrostatic printing.

In order to further illustrate the coatings included within the scope of the present invention and to further disclose the method of forming these coatings on various materials the following examples are given by way of illustration. It should be appreciated, however, that these examples are not intended to limit in any way the scope of the subjoined claims.

EXAMPLE 16

To 1,000 parts by weight of water, 50 parts by weight of $SnCl_4 \cdot 5H_2O$ was added and caused to go into solution. Finely divided metallic tin was added with stirring and the mixture was heated to 80° – 90° C. Care was taken to keep the mixture below the boiling point. As the temperature increased, a change in color occurred. At about 70°C., a slight yellowing became noticeable. At about 80°C. the color became a deep amber. At this point the system was allowed to cool and the hydrosol was decanted from the residual metallic tin. This solution was wiped onto a pane of glass and a pane of polymethylmethyacrylate. The resulting film was measured with an electron microscope and light interference techniques and found to be approximately 1,000 angstroms thick. There was no noticeable change in the color or the transparency of the sheet as a result of the application of the coating. Each of the sheets was divided into vertical halves. A half of each sample was further treated with an anionic dispersion of silica. A third pane of glass and a third pane of clear polymethylmethacrylate which was not given any treatment was exposed to the same conditions. Each of the samples were observed visually over an 18 month period. The untreated sample rapidly became solid and had to be periodically cleaned. Both the glass and the polymethylmethacrylate samples resisted soiling and after each rain, appeared to cleanse itself of accumulated soil. After about 12 months, the portion of each pane which was not treated with the silica began to show the visual accumulation of the soil which was found to be somewhat oily in nature. This portion of the sample despite the accumulation of the oily residue was still far superior to the untreated sample, even after 18 months of exposure with regard to soil resistance.

EXAMPLE 17

The steps of Examples 16 were carried out using $FeCl_3 \cdot 6H_2O$ in place of the stannic chloride and finely divided metallic iron in place of the metallic tin. Approximately equivalent results were obtained in the testing.

EXAMPLE 18

The steps of Examples 16 were carried out using $Cr_2(C_2O_4)_3$ in place of the stannic chloride and finely divided nickel in place of the metallic tin. Approximately equivalent results were obtained in testing.

EXAMPLE 19

The steps of Example 16 were carried out using $CrCl_3$ in place of the stannic chloride and finely divided nickel in place of the metallic tin. Approximately equivalent results were obtained in the testing procedure.

EXAMPLE 20

The steps of Example 16 were carried out using $BiCl_5$ in place of the stannic chloride and finely divided metallic bismuth in place of metallic tin. Approximately equivalent results were obtained in the testing procedure.

EXAMPLE 21

The steps of Example 16 were carried out using $Fe(C_2H_3O_2)_3$ in place of stannic chloride and finely divided metallic bismuth in place of metallic tin. Approximately equivalent results were obtained in the testing procedure.

EXAMPLE 22

The steps of Example 16 were carried out using finely divided metallic nickel in place of the finely divided metallic tin. Approximately equivalent results were obtained in the testing procedure.

EXAMPLE 23

The steps of Example 16 were carried out using $Sn(SO_4)_2$ in place of the stannic chloride and using finely divided metallic nickel in place of the finely divided metallic tin. Approximately equivalent results were obtained in the testing procedure.

EXAMPLE 24

The steps of Example 16 were carried out using finely divided metallic bismuth in place of the finely divided metallic tin. Approximately equivalent results were obtained in the testing procedure.

EXAMPLE 25

The steps of Example 16 were carried out using $Cr(C_2O_4)_3$ in place of the stannic chloride. Apporoximately equivalent results were obtained in the testing procedure.

I claim:

1. An inorganic hydrophilic polymer consisting essentially of (a) a major portion of first monomeric units of the formula

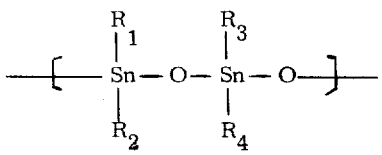

wherein at least one of the groups $R_1 - R_4$ is a member selected from the group consisting of —OH and —O— and at least one of the groups $R_1 - R_4$ is an anion of a water soluble salt of tin, the remainder of the groups $R_1 - R_4$ being members selected from the group consisting of —OH, —O— and an anion as defined above and (b) a minor portion of a second monomeric unit selected from the group consisting of

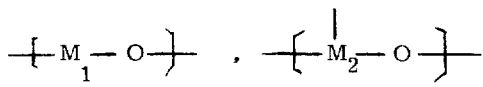

and mixtures thereof wherein $M_1$ is a divalent metal ion and $M_2$ is a trivalent metal ion of a metal having two stable states of oxidation in an aqueous medium said minor portions being effective to impart colloidal properties to said polymer when dispersed in water.

2. The polymer according to claim 1 wherein said anion is selected from the group consisting of chloride, bromide, sulfate and nitrate.

3. The polymer according to claim 1 wherein said second monomeric unit is represented by the formula

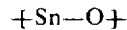

4. A process for the manufacture of the polymer according to claim 1 consisting essentially of the steps of adding to water a first amount of a water soluble stannic salt which is hydrolizable to a stannic oxide monomeric unit of the formula

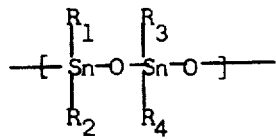

adding a second amount of a reactant selected from the group consisting of (1) a salt of a metal which has two stable valences in an aqueous solution, said salt being added in the lower valence state, and (2) an elemental metal, said second amount being an effective amount sufficient to react with said first amount of said stannic salt to provide said colloidally dispersible positively charged, hydrophilic polymer and heating the resulting aqueous mixture to an elevated temperature less than the boiling point of the mixture until a color change occurs in said mixture.

5. The process according to claim 4 wherein said stannic salt is stannic chloride.

6. The process according to claim 4 wherein said reactant is a stannous salt.

7. The process according to claim 4 wherein said reactant is stannous chloride.

8. The process according to claim 4 wherein said reactant is a metal.

9. The process according to claim 4 wherein said reactant is metallic tin.

10. The inorganic hydrophilic polymer according to claim 3 having an X-ray diffraction pattern with characteristic peaks as follows:

| "d" Spacing (A°) | Relative Intensity $I/I_0$ |
|---|---|
| 4.57 | 100 |
| 3.93 | 50 |
| 3.88 | 31 |
| 3.53 | 33 |
| 2.95 | 33 |
| 2.91 | 22 |
| 2.84 | 29 |
| 2.77 | 49 |
| 2.51 | 58 |
| 2.40 | 16 |
| 2.28 | 32 |
| 2.25 | 22 |
| 2.19 | 56 |
| 2.16 | 20 |
| 2.11 | 33 |
| 1.92 | 8 |
| 1.71 | 16 |
| 1.69 | 40 |
| 1.65 | 13 |
| 1.58 | 15 |
| 1.53 | 22 and |
| 1.42 | 22. |

* * * * *